United States Patent
Cicchitto

(10) Patent No.: US 10,623,397 B2
(45) Date of Patent: *Apr. 14, 2020

(54) AGGREGATOR TECHNOLOGY WITHOUT USERNAMES AND PASSWORDS

(71) Applicant: Avatier Corporation, Pleasanton, CA (US)

(72) Inventor: Nelson A. Cicchitto, San Ramon, CA (US)

(73) Assignee: Avatier Corporation, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,193

(22) Filed: May 18, 2018

(65) Prior Publication Data

US 2018/0270221 A1 Sep. 20, 2018

Related U.S. Application Data

(62) Division of application No. 15/626,997, filed on Jun. 19, 2017, now Pat. No. 9,979,715, which is a division
(Continued)

(51) Int. Cl.
*G06F 7/04* (2006.01)
*H04L 9/32* (2006.01)
(Continued)

(52) U.S. Cl.
CPC .......... *H04L 63/0815* (2013.01); *G06F 21/32* (2013.01); *H04L 63/083* (2013.01)

(58) Field of Classification Search
CPC .... H04L 63/0815; H04L 63/083; G06F 21/32
(Continued)

(56) References Cited

U.S. PATENT DOCUMENTS

| 5,446,891 A | 8/1995 | Kaplan et al. |
| 7,103,666 B2 | 9/2006 | Royer et al. |

(Continued)

FOREIGN PATENT DOCUMENTS

EP 1089516 A3 8/2002

OTHER PUBLICATIONS

Grassi, Paul A. et al., "Digital Identity Guidelines", NIST Special Publication 800-63A, Jun. 2017, 1-32.
(Continued)

*Primary Examiner* — Aravind K Moorthy
(74) *Attorney, Agent, or Firm* — Perkins Coie LLP; Michael Glenn

(57) ABSTRACT

Techniques are described in which to access a user's web applications, the user registers and signs on to an aggregator system using any supported login identity provider username and password. When the user registers for the first time, the system collects additional information to verify the user for a subsequent access to the system. The system also automatically creates a system secret username and secret, highly securely generated password, both of which are unknown and inaccessible to the user. The secret username and password are stored in a lightweight directory access protocol (LDAP) server or database or in a distributed cloud database system. The system also maps the login identity provider user name to the secret user name and password for subsequent usage.

7 Claims, 14 Drawing Sheets

Related U.S. Application Data of application No. 15/052,747, filed on Feb. 24, 2016, now Pat. No. 9,686,273.

(60) Provisional application No. 62/120,153, filed on Feb. 24, 2015.

(51) Int. Cl.
*G06F 21/00* (2013.01)
*H04L 29/06* (2006.01)
*G06F 21/32* (2013.01)

(58) Field of Classification Search
USPC ............... 726/6, 5; 713/168, 182, 183, 186
See application file for complete search history.

(56) References Cited

U.S. PATENT DOCUMENTS

| | | | |
|---|---|---|---|
| 7,346,923 B2 | 3/2008 | Atkins et al. | |
| 7,536,389 B1 | 5/2009 | Prabhakar et al. | |
| 8,073,810 B2 | 12/2011 | Maes et al. | |
| 8,533,773 B2 | 9/2013 | Maes et al. | |
| 8,589,338 B2 | 11/2013 | Maes et al. | |
| 9,037,864 B1 | 5/2015 | Staddon et al. | |
| 9,449,258 B1 | 9/2016 | Palacio et al. | |
| 9,686,273 B2 * | 6/2017 | Cicchitto | H04L 63/083 |
| 9,838,260 B1 | 12/2017 | McClintock | |
| 9,979,715 B2 * | 5/2018 | Cicchitto | H04L 63/083 |
| 2003/0065919 A1 * | 4/2003 | Albert | G06F 21/31 |
| | | | 713/168 |
| 2003/0163738 A1 | 8/2003 | Couillard et al. | |
| 2003/0217148 A1 * | 11/2003 | Mullen | H04L 63/08 |
| | | | 709/225 |
| 2004/0128546 A1 * | 7/2004 | Blakley, III | G06F 21/6245 |
| | | | 726/8 |
| 2005/0238159 A1 | 10/2005 | Halsell et al. | |
| 2008/0134305 A1 * | 6/2008 | Hinton | H04L 63/08 |
| | | | 726/5 |
| 2008/0289006 A1 | 11/2008 | Hock et al. | |
| 2009/0006195 A1 | 1/2009 | Rosen et al. | |
| 2009/0017847 A1 | 1/2009 | Mendiola et al. | |
| 2009/0292814 A1 | 11/2009 | Ting et al. | |
| 2011/0314515 A1 * | 12/2011 | Hernoud | H04W 12/06 |
| | | | 726/2 |
| 2013/0263021 A1 | 10/2013 | Dunn et al. | |
| 2013/0290475 A1 | 10/2013 | Flagg et al. | |
| 2013/0314208 A1 | 11/2013 | Risheq et al. | |
| 2013/0346337 A1 | 12/2013 | O'donnell et al. | |
| 2014/0201806 A1 | 7/2014 | Kumar | |
| 2014/0298490 A1 | 10/2014 | Clark et al. | |
| 2015/0127678 A1 | 5/2015 | Alvi et al. | |
| 2015/0149529 A1 | 5/2015 | Loader et al. | |
| 2015/0205954 A1 | 7/2015 | Jou et al. | |
| 2015/0304330 A1 | 10/2015 | Soamboonsrup et al. | |
| 2016/0048662 A1 | 2/2016 | Arnoud et al. | |
| 2016/0112397 A1 | 4/2016 | Mankovskii | |
| 2016/0119325 A1 | 4/2016 | Doshi | |
| 2016/0127367 A1 | 5/2016 | Jevans | |
| 2016/0173500 A1 | 6/2016 | Sharabi et al. | |
| 2016/0202969 A1 | 7/2016 | Nachtigal | |
| 2016/0226911 A1 | 8/2016 | Boss et al. | |
| 2016/0306965 A1 | 10/2016 | Iyer et al. | |
| 2017/0118239 A1 | 4/2017 | Most et al. | |
| 2017/0140312 A1 | 5/2017 | Pai et al. | |
| 2017/0161503 A1 | 6/2017 | Seigel et al. | |
| 2017/0195352 A1 | 7/2017 | Yishay et al. | |
| 2018/0004948 A1 | 1/2018 | Martin et al. | |
| 2018/0183827 A1 | 6/2018 | Zorlular et al. | |
| 2018/0343246 A1 | 11/2018 | Benayed | |

OTHER PUBLICATIONS

Grassi, Paul A. et al., "Digital Identity Guidelines", NIST Special Publication 800-63C, Jun. 2017, 1-34.

Grassi, Paul A. et al., "Digital Identity Guidelines", NIST Special Publication 800-63 Revision 3, Jun. 2017, 1-53.

Grassi, Paul A. et al., "Digital Identity Guidelines", NIST Special Publication 800-63B, Jun. 2017, 1-55.

* cited by examiner

Options
- Web Applications
- Delegation
- Multi-Factor Authentication
- Security
- Terms of Use
- Verification

Done

Delegation

Create New Delegation

Delegation Type: SocialLogin.me ▸

Provider Type: Sign in with Facebook ▸

Provider user name: julie@yahoo.com

Apply to these SSO Enterprise Connectors:
(Enter search filter) [Apply Filter] [Clear Filter]

Create

◀◀ ◀ 1 2 ▶ ▶▶   Page size: 200 ▼

| ☐ | Web Application | | ▼ Updated On |
|---|---|---|---|
| ☑ | Go Daddy | Go Daddy — Register Domain Names https://lsp.godaddy.com/login.aspx?spkey=GDMYA4+1301171; | Jan 21  11:52 AM |
| ☐ | Facebook | Facebook — The Social Network https://www.facebook.com/ | Jan 27  11:07 AM |

Refresh

Password Station
Single Sign-On
HR Feeds
Reports

FIG. 10

FIG. 11 Welcome / One-click web logins.

FIG. 12 Add / Add your applications.

AGGREGATOR TECHNOLOGY WITHOUT USERNAMES AND PASSWORDS

CROSS REFERENCE TO RELATED APPLICATIONS

This patent application is a divisional of U.S. patent application Ser. No. 15/626,997, filed Jun. 19, 2017, now U.S. Pat. No. 9,979,715, which is incorporated herein by reference in its entirety and which is a divisional of U.S. patent application Ser. No. 15/052,747, AGGREGATOR TECHNOLOGY WITHOUT USERNAMES AND PASSWORDS, filed Feb. 24, 2016, now U.S. Pat. No. 9,686,273, issued Jun. 20, 2017, which is incorporated herein by reference in its entirety, and additionally claims priority from U.S. Provisional Patent Application No. 62/120,153, SOCIAL SINGLE SIGN-ON AGGREGATOR WITHOUT USERNAMES AND PASSWORDS, filed Feb. 24, 2015, which is also incorporated herein by this reference in its entirety.

BACKGROUND OF THE INVENTION

Technical Field

This innovation relates generally to the field of automated identity and access management technology. More specifically, this innovation relates to using aggregator technology without usernames and passwords for automating identity and access management.

Background

Many organizations rely on technological identity and access management solutions to keep pace with the growth of their organizations, e.g. gaming and hospitality enterprises. Thus, for example, such organizations deploy automated user de-provisioning or password policy enforcement.

In today's environment, partner enterprises allow an external user from one organization outside of their network to have access to an internal application of their organization within their own network. This type of partnership can be referred to as federated identity management. With using federated identity management, an internal application written at Company A can be made publicly available. For a user at Company B on one type of network to access on an entirely different network the internal application written at Company A, the user has to perform the following procedure. The user creates an internal ID at Company A, enters the internal application and maps his external ID from his own network to his internal ID on Company A's network. Further, Company A can allow the user to access their internal application by the user using a social network account, such as a LinkedIn (Mountain View, Calif.; "LinkedIn") account for example. Then, Company A can link the external user's social network account sign on to Company A's internal application.

The technique described above allows Company A to manage their partners' access to their internal applications.

Today, there's a technology known as federation, which allows an enterprise to manage their partners' access to their internal applications. However, federation requires high maintenance for every partner company and a lot of initial effort to set up and configure.

SUMMARY

Techniques are described in which to access a user's web applications, the user registers and signs on to an aggregator system using any supported login identity provider username and password or other authenticating credentials. When the user registers for the first time, the system collects additional information to verify the user for a subsequent access to the system. The system also automatically creates a system secret or private identity such as a secret username and secret, highly securely generated password, both of which are unknown and inaccessible to the user. The secret identity, such as secret username and password, is stored in a lightweight directory access protocol (LDAP) server or database or in a distributed cloud database system. The system also maps the login identity provider user name to the secret user name and password for subsequent usage.

BRIEF DESCRIPTION OF THE DRAWINGS

One or more embodiments of the present invention are illustrated by way of example and not limitation in the figures of the accompanying drawings.

FIG. 1 illustrates an example of an interface of a user's page of an aggregator platform, according to an embodiment;

FIG. 9 illustrates an example of a user interface of a delegation page in which a user can enter a delegation type, provider type, provider user name, applicable filters, and a selection of one or more applications to share, according to an embodiment;

FIG. 10 illustrates an example of a user interface showing a sample dropdown list of the provider types of FIG. 9, according to an embodiment;

FIG. 11 illustrates an example of a user interface showing a home page of the aggregator system, according to an embodiment;

FIG. 12 illustrates an example of two different devices, a tablet and a smartphone, each displaying the home page web page of the aggregator system, according to an embodiment;

DETAILED DESCRIPTION

Figure 2:
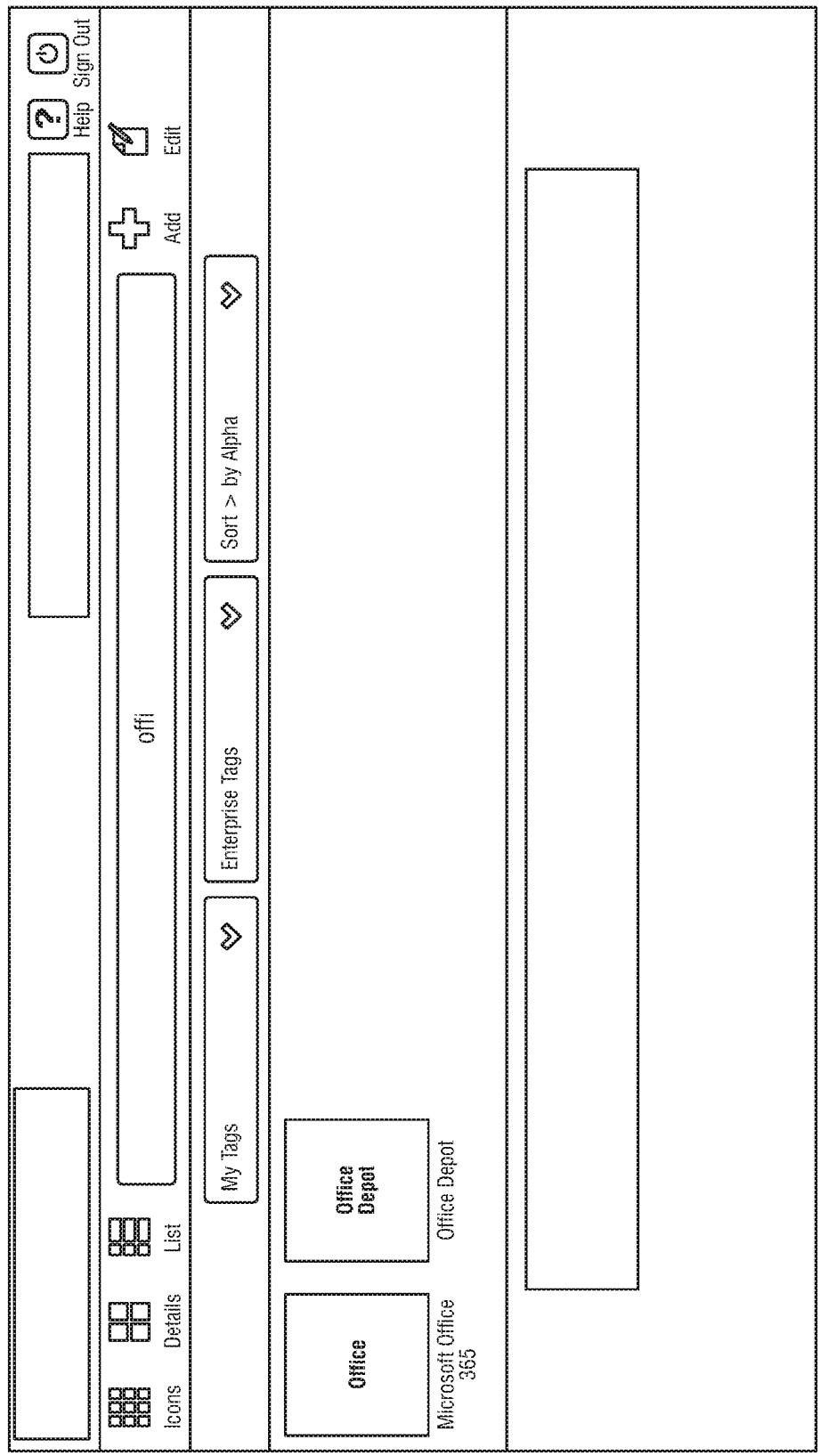
FIG. 2 illustrates an example of a user interface showing two icons representing an enabled application on the aggregator platform and a not-enabled application on the aggregator platform, according to an embodiment.

Introduced here is a technique with which to access a user's web applications. The user registers and signs on to an aggregator system using any supported login identity provider username and password. When the user registers for the first time, the system collects additional information to verify the user for a subsequent access to the system. The system also automatically creates an system secret username and secret, highly securely generated password, both of which are unknown and inaccessible to the user. The secret username and password are stored in an lightweight directory access protocol (LDAP) server or database or in a distributed cloud database system. The system also maps the login identity provider user name to the secret user name and password for subsequent usage.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

An Exemplary Embodiment of an Aggregator Platform without Usernames and Passwords An exemplary embodiment of an aggregator platform without usernames and passwords is a social single sign-on ("sSSO") platform. It should be appreciated that the technique discussed herein can also refer to the aggregator system or application, depending on the context of the discussion. Such platform comprises a server that aggregates a plurality of web applications both internal to an organization and that are public facing to login identity providers including social networking sites such as for example LinkedIn or Facebook (Menlo Park, Calif.; "Facebook"). The platform presents the aggregation of such web applications as links provided to a particular user.

Examples of login identity providers include but are not limited to social networking sites, Linkedin and Facebook. A sample non-exhaustive list can be found in FIG. 4, which is described in further detail below.

Figure 1:
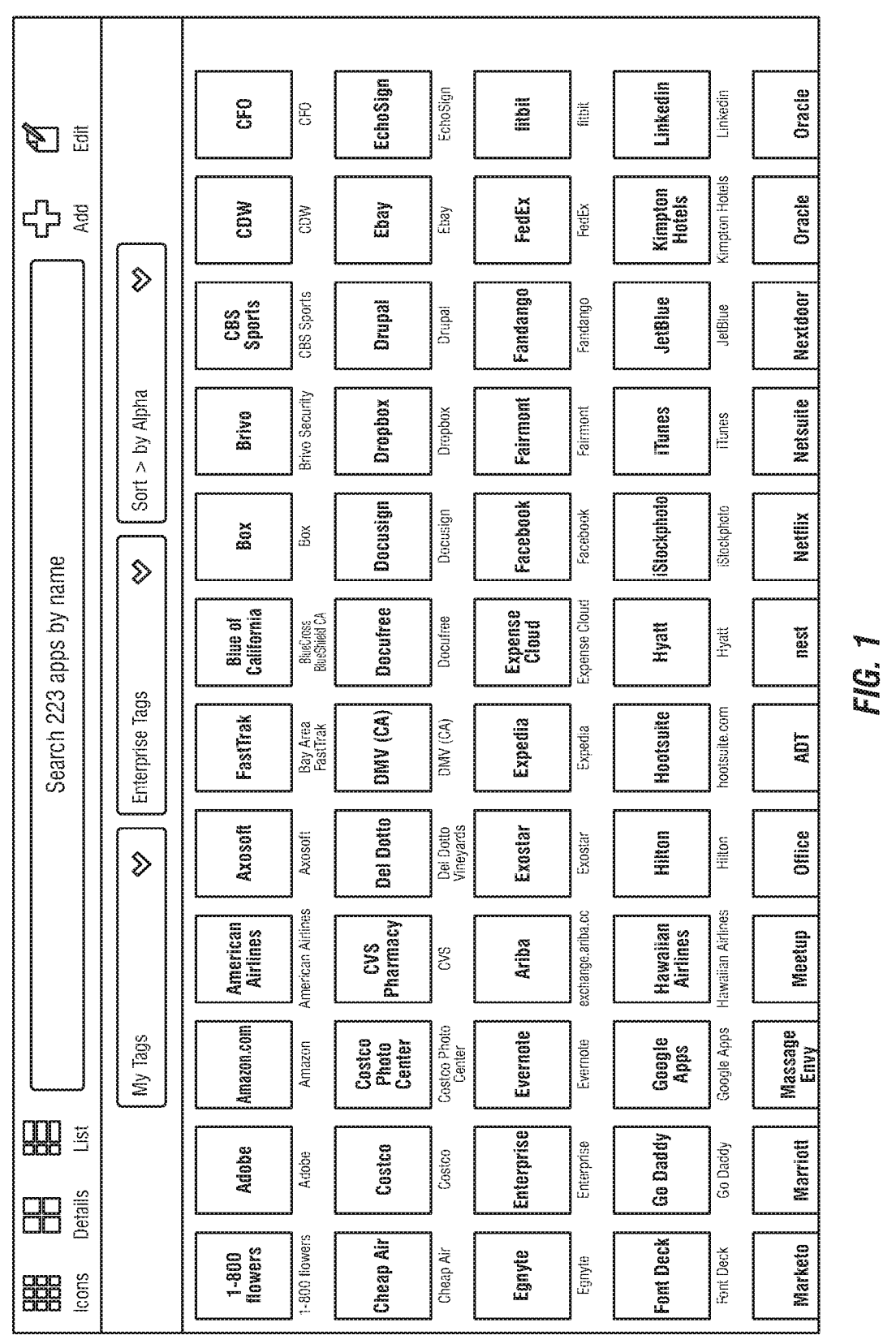

Non-exhaustive examples of web applications that can be aggregated by the server can be found in FIG. 1. FIG. 1 is a sample innovative interface of a user's page on a sSSO application, which displays a collection of web applications which the user had previously added to his sSSO application.

It should be appreciated that the aggregator platform is not limited to the social single sign-on environment. The techniques introduced herein are applicable to aggregators that allow end users to add an application, such that to link to the application at any future time, and from any device, would not need to reenter an ID and/or password. However, employing the social single sign-on implementation of the technique as discussion herein is for purposes of understanding the innovation herein and not for limiting purposes.

To access any of the user's web applications, the user registers and signs on to a social sign-on system ("sSSO") using any supported login identity provider user name and password. For example, the user can register to sSSO using his user name and password that he uses for his Linkedin account. If the user is registering for the first time, the sSSO collects additional information to verify the user later such as for a subsequent access to sSSO. For example, sSSO can collect but is not limited to collecting the user's mobile phone number, questions and answers related to information unique to the user, pictures, biometric data, and/or social information from the identity providers, such as for example information regarding friends, pictures, dates, and conversations. sSSO also automatically creates an sSSO secret user name and a sSSO secret, highly securely generated password. Both such secret user name and secret password are unknown and inaccessible to the user. In an embodiment, this secret user name and secret password are stored in a lightweight directory access protocol (LDAP) server or database or in a distributed cloud database system, etc. sSSO also maps or links the login identity provider user name to the secret user name and password of sSSO system for subsequent usage.

After the user has registered, the user can start using signal sign-on to login automatically to web applications available to the sSSO system. The login identity provider is mapped to the sSSO secret internal user name for purposes of displaying the configured SSO enabled web applications to the appropriate sSSO logged in user. In short, the sSSO secret internal user name is used to display the right apps (web applications) to the right user. Thus, for example, when the user obtains a new, upgraded smartphone, the user does not need to download and reenter the user ID and password for each of his web applications. The user can access any and all of his applications registered in the sSSO from the sSSO application.

FIG. 2 is a sample user interface showing icons representing an enabled and a not enabled SSO application. In this example, the leftmost icon, e.g. Office, represents an SSO enabled application while the icon to the right represents a web application, e.g. Office Depot, that is not enabled. In this example, the sSSO application is configured to display a visual indicator, such as the triangle with the exclamation sign inside, to indicate that such web application is not sSSO enabled.

Figure 3:
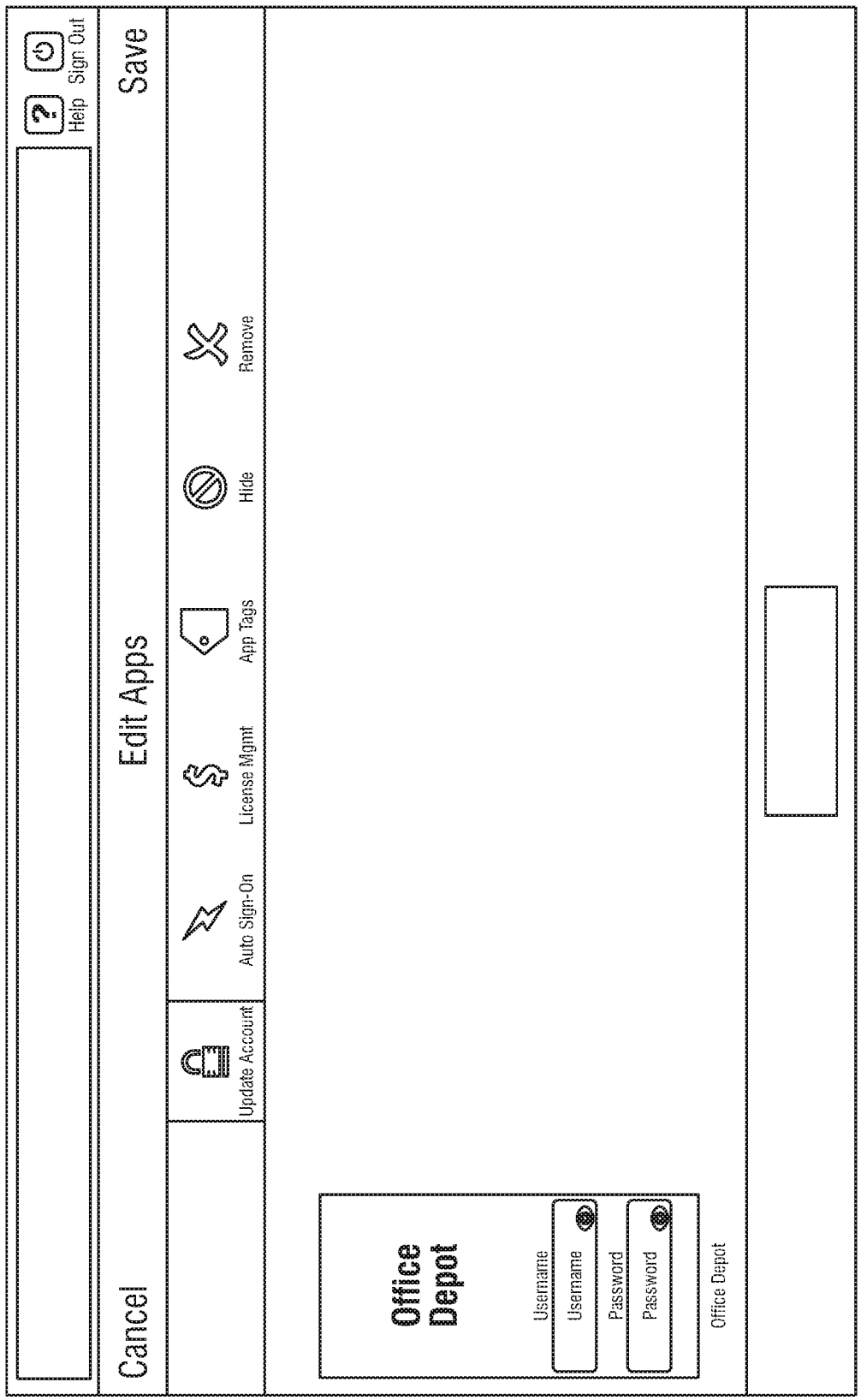
FIG. 3 illustrates an example of a user interface showing a log in graphical user interface (GUI) for a user to add and configure an organization to his aggregator platform, according to an embodiment.

In an embodiment, to enable a web application for sSSO requires entering a user name and optionally a password. An example implementation can be found in FIG. 3. FIG. 3 is a sample user interface of a registration screen to register a particular web application. In the registration screen, a user can enter his or her user name and optionally his or her password for the particular web application.

If the SSO web application, e.g. Office Depot in FIG. 3, is also a login identity provider then sSSO automatically maps or otherwise links the new login identity provider to the sSSO internal secret user name, which enables that login identity provider, e.g. Office Depot, to be used for login in purposes in addition to the existing registered login identity provider, e.g. the original sSSO system. As another example, Facebook and LinkedIn could both be login identity providers to the sSSO system assuming the LinkedIn web application was enabled for single sign-on.

If the sSSO user decides to login using a new unregistered login identity provider, e.g. Facebook, and the user never enabled that login identity provider web application for SSO, the sSSO system will attempt to identify the end user. For example, the sSSO system can go to and use a stored list of usernames and related metadata such as email addresses, actual names, etc., and display candidate selections, e.g. a list of users with similar names from the registered login identity providers, e.g. FACEBOOK: Julie@yahoo.com.

That is, the sSSO system prompts the user to pick the login identity provider user name that they recognize. The login identity provider user name can be received by other input means such as for example the user entering his or her user name in a text box, audibly providing the user name, selecting an image that is recognized by the user, providing biometric data such as a finger print, and so on. In addition to using the received user input, the sSSO verifies the identity of the sSSO user by using additional registration information, that is information which was provided by the user when the user registered. For example, such additional registration information can include but is not limited to SMS, Questions/Answers, already registered login identity provider information, biometric information, etc.

Figure 4:
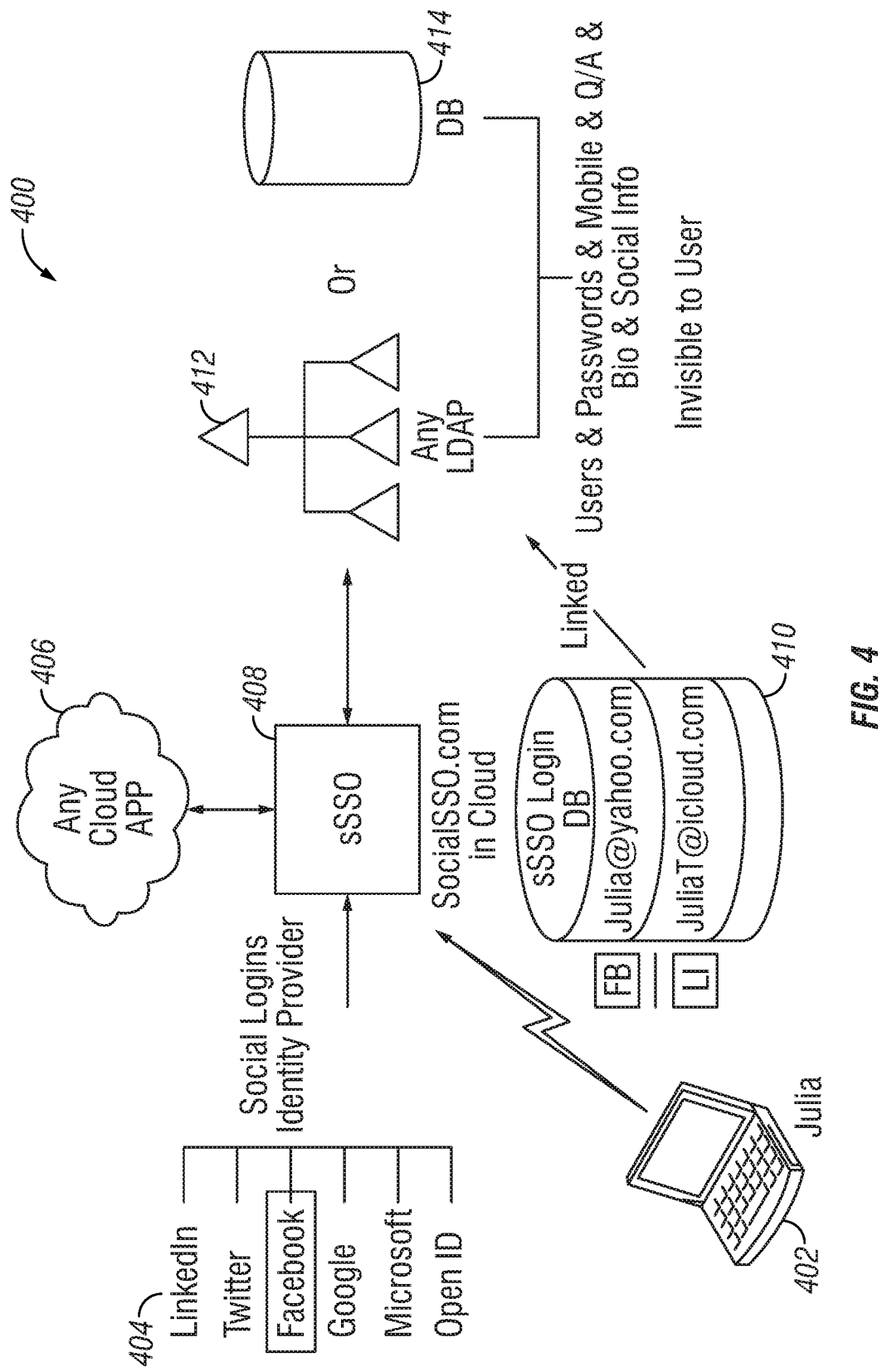
FIG. 4 is a schematic diagram of a system architecture for the aggregator platform, according to an embodiment.

An Exemplary Embodiment of Social Single Sign-on without Username or Password from a Single Sign-on Provider An embodiment can be understood with reference to FIG. 4. FIG. 4 is a schematic diagram of a system architecture for an aggregator platform, such as for example sSSO, without username or password from the provider, such as for example a SSO provider, 400. A user 402 logs into a social single sign-on (sSSO) application 408, e.g. such as at a website, SocialSSO.com for example, in a network environment such as in a cloud environment. A plurality of social login identity providers 404 are communicably connected with sSSO 408 such that for example a user can log onto sSSO 408 through any of these connected social logins identity providers 404. sSSO 408 is communicably connected to a repository, sSSO login database (DB) 410. In this illustrative example, repository 410 is storing two usernames associated with user 402: Julia@yahoo.com associated with her Facebook account and JuliaT@icloud.com associated with her Linkedin account. sSSO 408 is communicably connected to web applications in the cloud 406. When the user registered with sSSO 408, sSSO 408 requested additional data from the user that could be used in identifying the user at subsequent points in time. Types of such data include but are not limited to user data, passwords, mobile data, questions and answers, biometric data, and social data. sSSO 408 stores such data in a second repository 414 via a distributed directory information service over an Internet Protocol (IP) network 412 such as for example a Lightweight Directory Access Protocol (LDAP) system 412. These user names and other data stored in repository 414 and accessible via service 412 are invisible and inaccessible to the users. Thus, user 402 can login to sSSO 408 using any of her existing social usernames (as shown in repository 410) associated with the respective social login identity provider, which is linked to the user's secret data stored in repository 414. Then, after making the link, sSSO proceeds to verify the user by using any of such data in repository 414, such as for example, asking for a cell phone number or a asking a question and expecting a specific answer that matches a stored answer.

Social Federation Social Single Sign-on

Social Federation social single sign-on ("sFed") can be a system, API, or service that enables an organization such as a company, a university, or a government agency, etc. or end user to easily and securely enable an external party such as a contractor, vendor, alumni, family, friends, etc. access to internal (private) and external (public) web applications without using traditional federation technologies or manually requiring setting up a new user name and password. sFed combined with sSSO easily and securely shares web site login-related data with any user who already has a username and password on a login identity provider website.

Figure 5A:
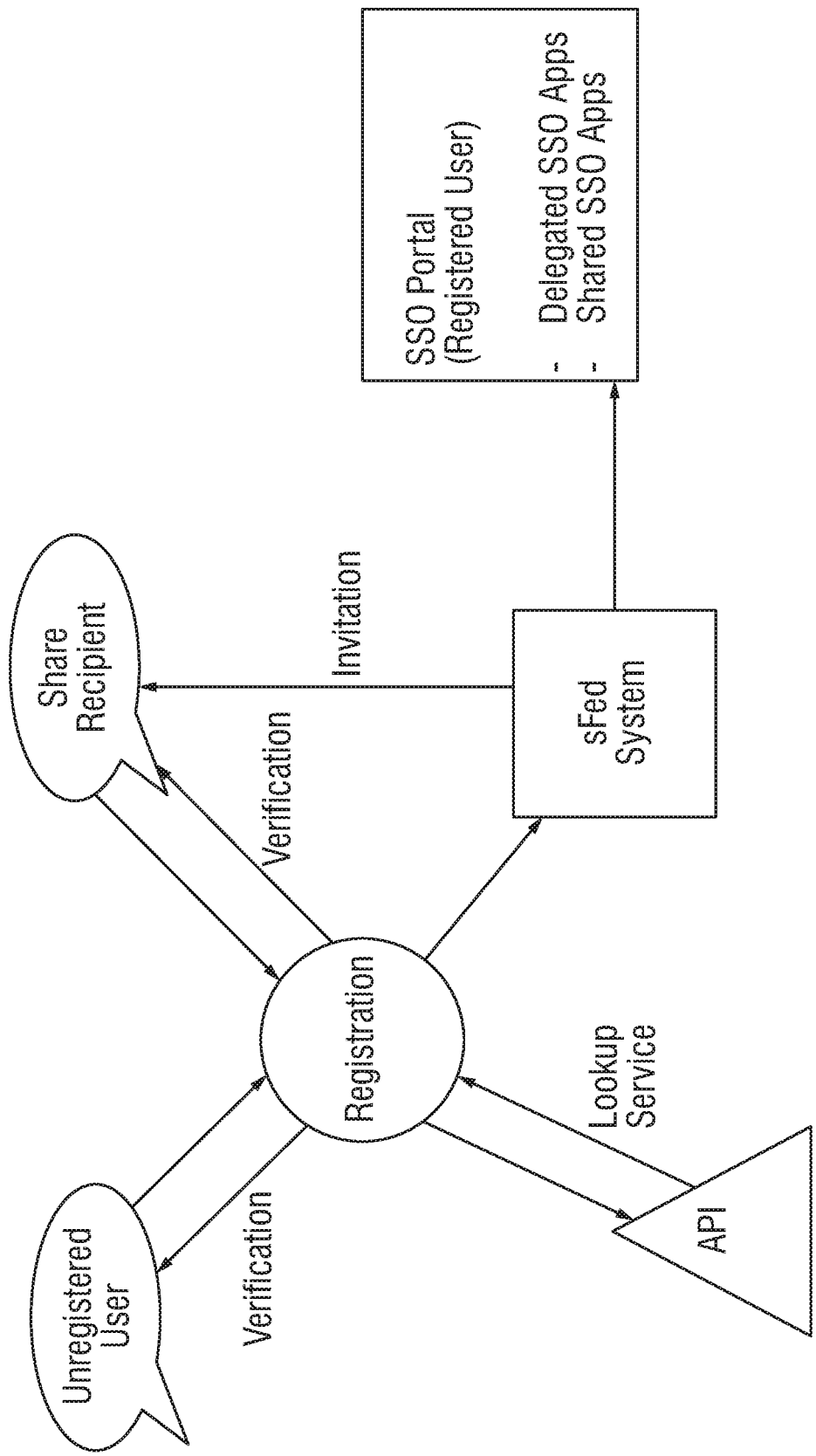
FIG. 5A is a flow diagram of a process for registration to a social federation system, according to an embodiment.

An embodiment of the invention can be understood with reference to FIG. 5A. FIG. 5A is a flow diagram of a process for registration to a social federation system. To use the sFed system requires an external party to register in sSSO or any registered sSSO user to invite an unregistered sSSO user. After they have been registered, the sFed system detects sSSO registration and registered login identity provider user name. Using the sFed system, API, or service, the organization sFed administrator or a sSSO user can delegate (share) sSSO enabled web applications to a registered user or invite an unregistered sSSO user which automatically registers the user into the sSSO system by requiring the invited user to login once to the sSSO system using a login identity provider user name. For example, FACEBOOK: Julie@yahoo.com registers on sSSO and sFed verifies her identity by sending her a SMS token, or question associated with an expected (Q/A), or requiring a biometric confirmation. Thus, in an embodiment, requiring a user to remember and enter login informational data is not needed. sSSO is configured to transmit an alert to the user, where the user can respond with identifying-related data as discussed above.

Figure 5B:
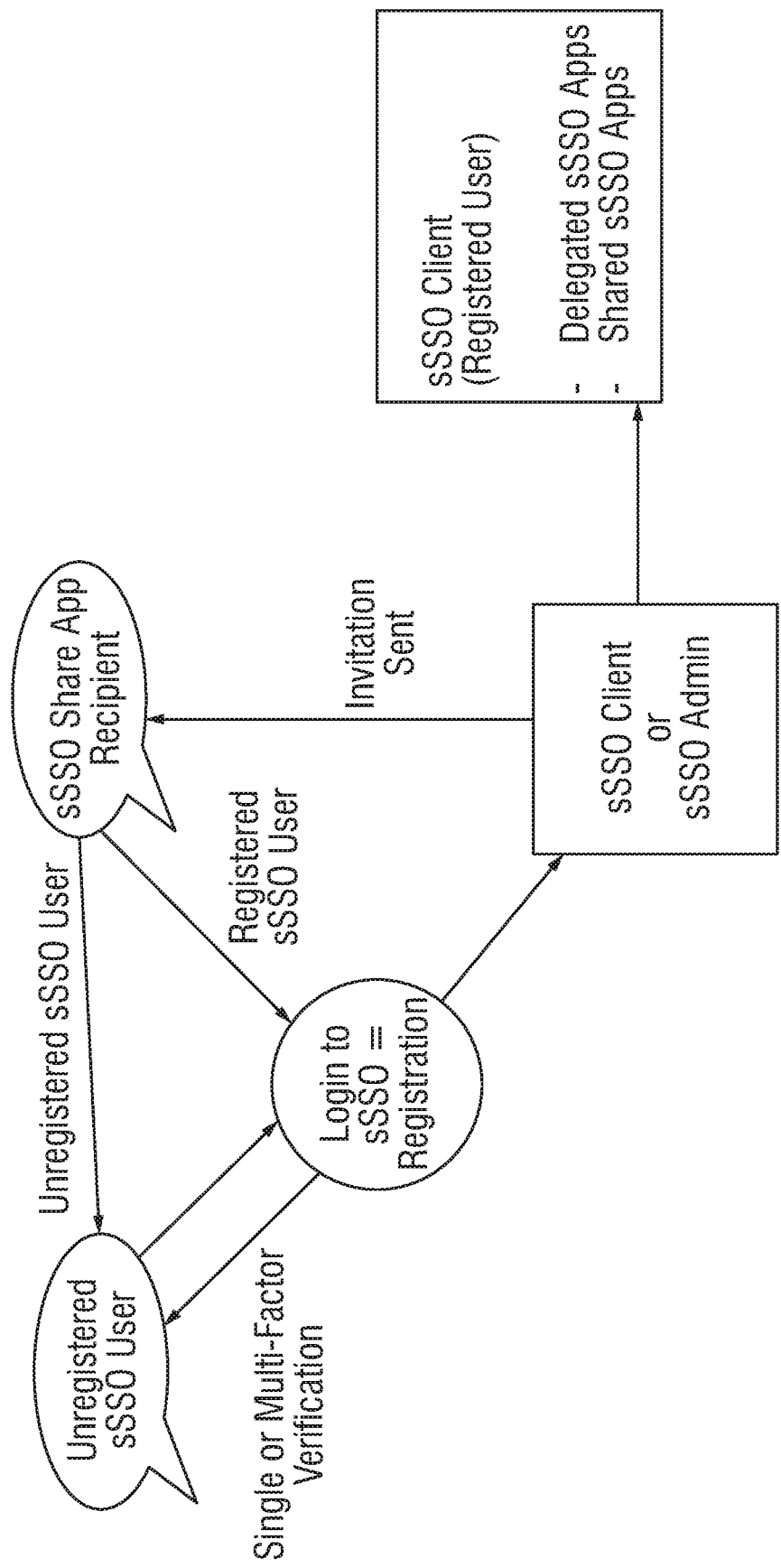
FIG. 5B is a flow diagram of a process for registration to an aggregator system, according to an embodiment.

An embodiment of the invention can be understood with reference to FIG. 5B. FIG. 5B is a process flow for registration to the sSSO system. A user such as an sSSO Client or sSSO Administrator sends an invitation to a recipient, e.g. sSSO Share App Recipient, for the purposes of sharing or delegating an application. If the sSSO recipient is already registered with sSSO, e.g. is a Registered sSSO User, then when such sSSO recipient logs in to sSSO and accepts the invitation, the delegated application is added by the sSSO system to the recipient's collection of sSSO applications. If the sSSO recipient is not yet registered with sSSO, then with the invitation, such recipient is provided the opportunity to register with the sSSO system by providing single or multi-factor verification data. Subsequently, the recipient is a registered sSSO user and the application is added to such user's collection of sSSO applications.

In an embodiment, sSSO enables a user to share login capability along with sharing an application.

Figure 6:
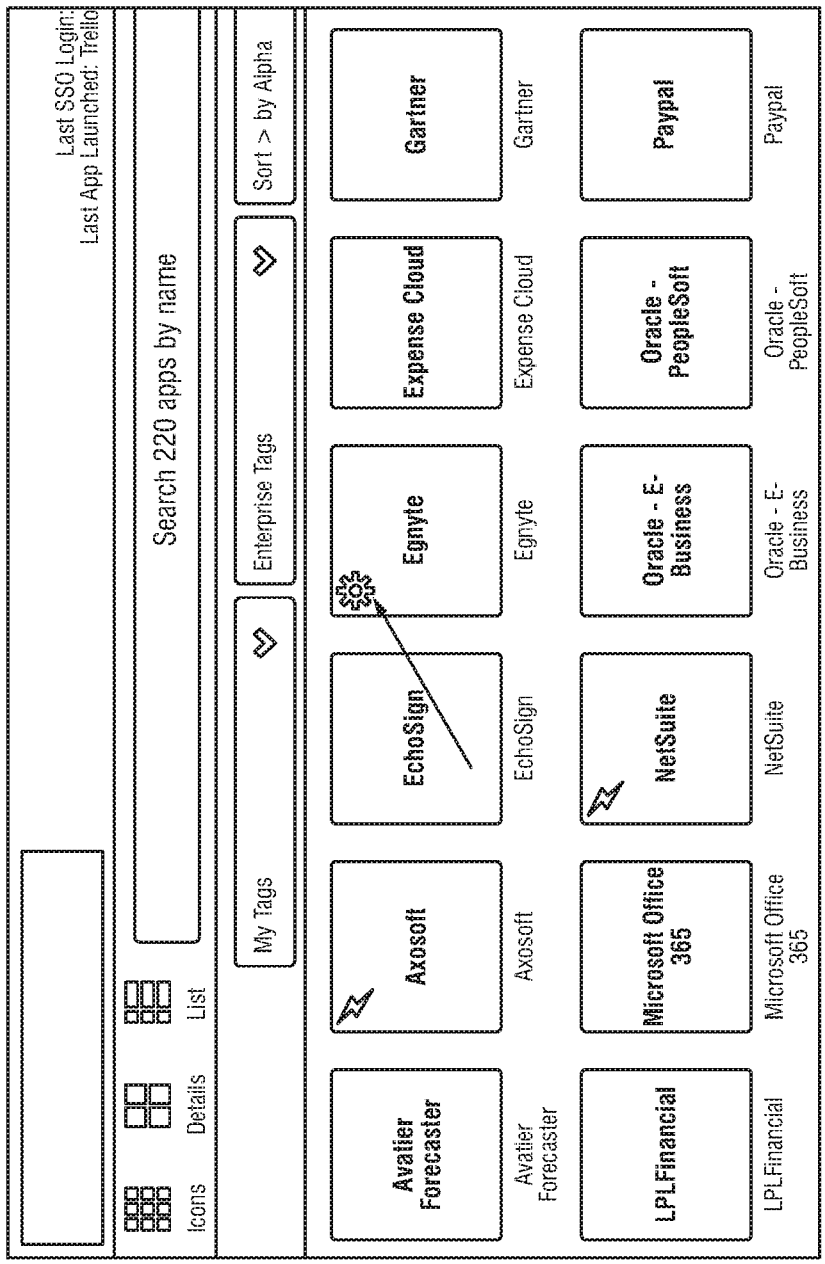
FIG. 6 illustrates an example of a user interface showing an SSO user sharing an application with an unregistered or registered SSO user, according to an embodiment.

FIG. 6 is a sample user interface showing an SSO user sharing an application with an unregistered or registered SSO user. The user initiates the process for the selected SSO application, e.g. Egnyte, by clicking on the icon.

Figure 7:
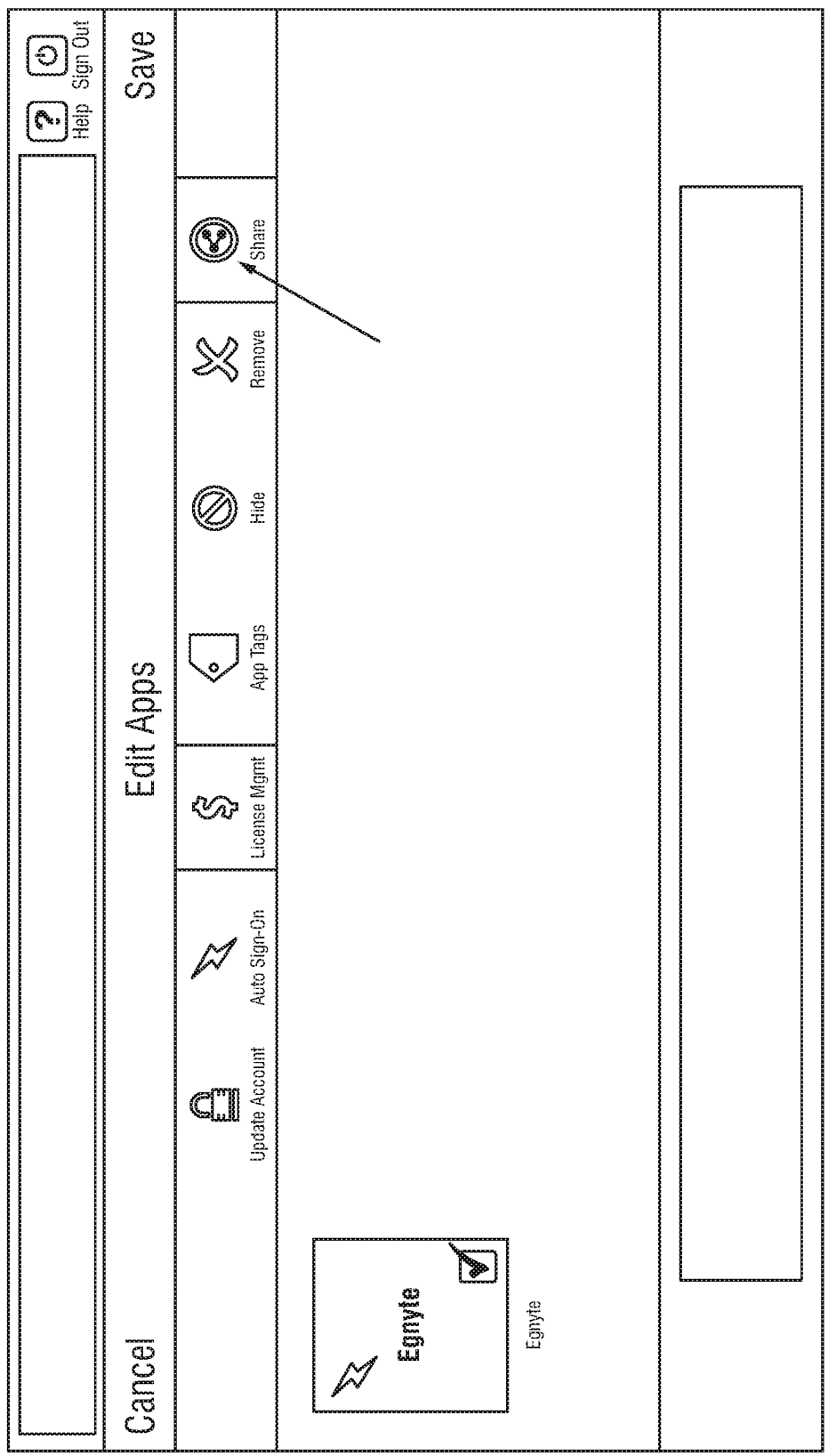
FIG. 7 illustrates an example of a user interface showing a user has selected a Share command to send to a recipient user.

FIG. 7 is a sample user interface showing a user has selected a share command to send to a recipient user. The share command can be sent via multiple methods including but not limited to email, SMS, social network, copying, etc.

Figure 8:
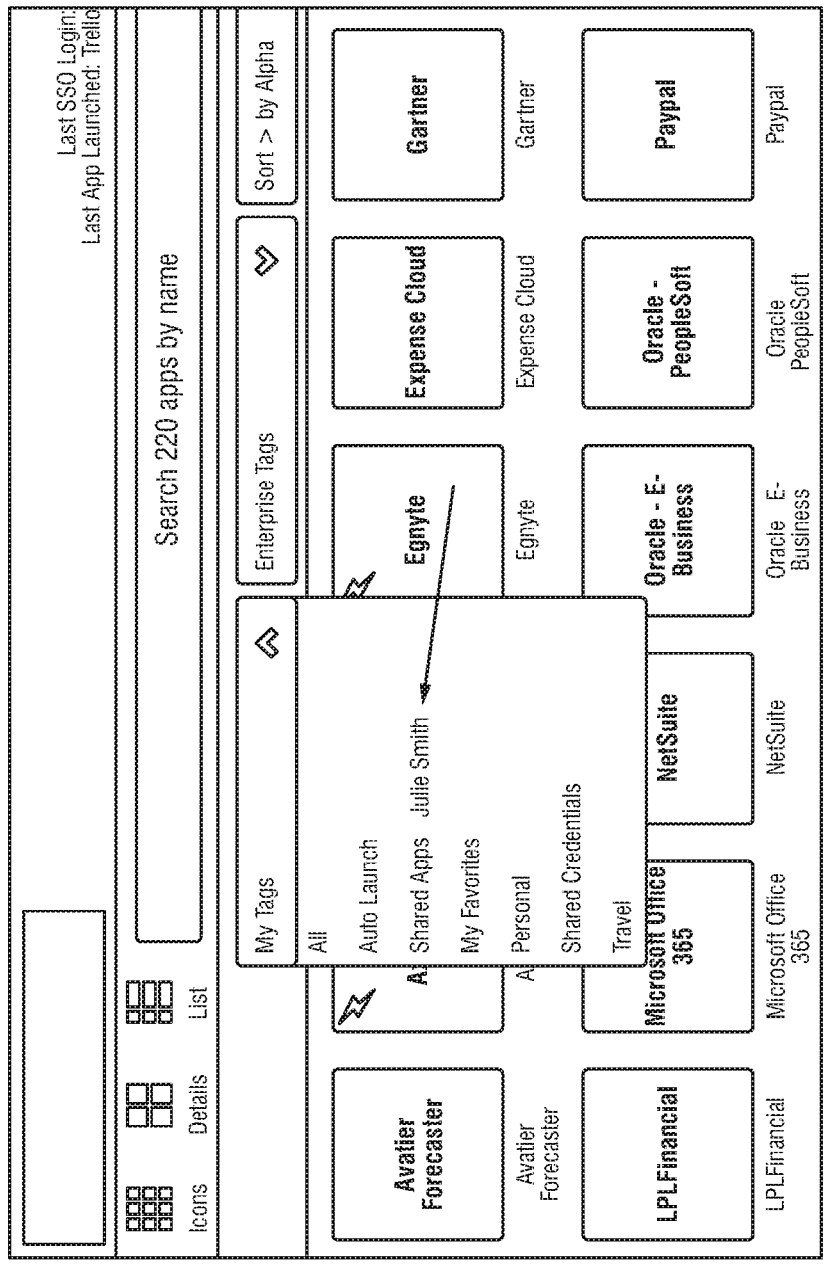
FIG. 8 illustrates an example of a user interface showing how after the SSO user proceeds with registration or log in to SSO, the system provides the user the capability of seeing his shared SSO applications, according to an embodiment.

FIG. 8 is a sample user interface showing how after the SSO user proceeds with registration or login to SSO, they subsequently have capability of seeing or accessing shared SSO applications. For example, the user can access the shared applications by selecting a drop menu that contains a link to a shared apps page. In this example, the system provides a link to shared applications for each recipient.

An embodiment provides a sSSO delegation administrator model and corresponding functionality. An administrator can delegate a particular sSSO user to a particular sSSO application, as shown in FIG. 9 for example. FIG. 9 is a sample user interface of a delegation page in which a user can enter a delegation type, e.g. SocialLogin.me, provider type, e.g. Sign in with Facebook, a provider user name, e.g. Julie@yahoo.com, applicable filters, and a selection of one or more applications to share, e.g. Go Daddy.

Figure 10:
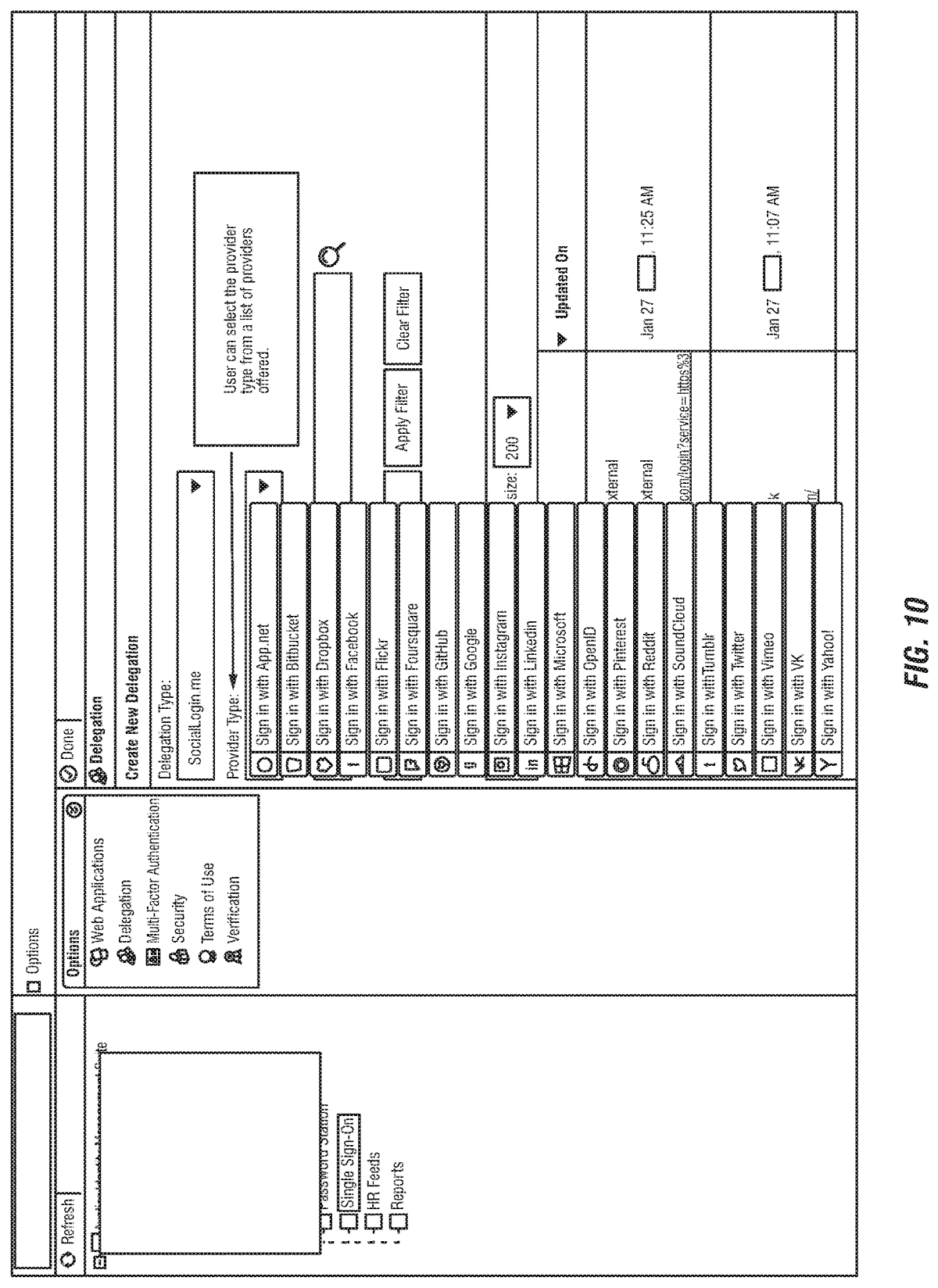

FIG. 10 is a sample user interface showing a non-exhaustive sample dropdown list of the provider types of FIG. 9, each selected type enabling the user to sign in to sSSO and/or sSSO's various enabled web applications or sSSO enterprise connected applications.

If the sFed administrator or sSSO end user is delegating (sharing) a SSO enabled web application, that is using a fixed username and password or a known user name and password to multiple people or shared within the organization to the sSSO user, then system is configured to cause the shared web application to automatically appear on the sSSO users' sSSO interface. For example, sFed uses an API or direct database calls to add the new SSO enabled web application to the user's sSSO interface.

If the sFed administrator is delegating a SSO enabled web application that is using a username and password that is unique to the sSSO user, then sFed automatically creates a user name and password on the enabled web application. For example sFed can use a format for exchanging authentication and authorization data between parties such as between an identity provider and a service provider, e.g. Security Assertion Markup Language (SAML). Or sFed can use internal methods. Then the SSO enabled web application automatically appears enabled on the sSSO user's sSSO interface.

Web Crawler for Applications Requiring Logons

A technique is introduced by which a web crawler system crawls for web applications that require logons, regardless of content. Each identified web application is added to a database, such as for example the sSSO databases 410 or 414, of such type of applications. In accordance to one technique, the web crawler system discovers a web application and then attempts to logon to the application with a bogus ID and a bogus password. If the attempt is unsuccessful, the web crawler system creates a definition for the web application, where the definition defines attributes of the web application. The web crawler system uses these attributes to categorize the web application within the database. Based on matching the categorization and user profiles, the web crawler system offers the web application to a particular user to add the web application to the user's aggregation of web applications. For instance, the web crawler system can display or send a message to the particular user indicating, "You like bicycles. Perhaps you'd like to add this bicycle application ('bikeapp.com') to your aggregated applications."

Alternate Embodiments

Figure 14:
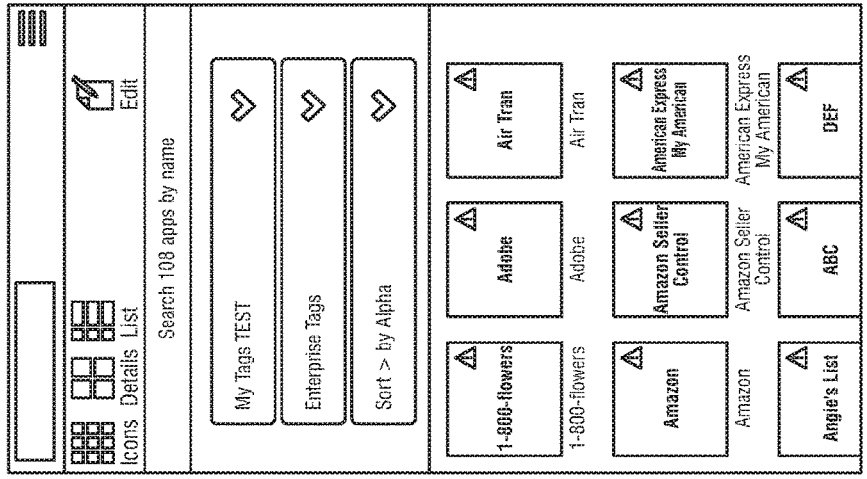
FIG. 14 illustrates an example of a user interface showing icons representing web applications which were added to the system and from which the user can launch with just one click, according to an embodiment.
Figure 13:
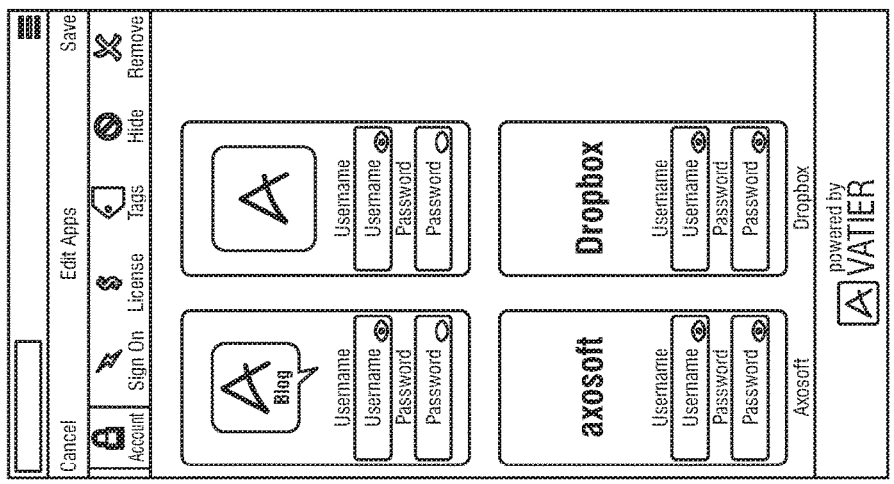
FIG. 13 illustrates an example of a user interface showing four web applications that a user can configure to add to his aggregator system, according to an embodiment.

A smartphone or tablet paradigm or environment illustrates how the innovation solves the technical problem of using computer network resources and bandwidth efficiently by streamlining user interactions with the network. FIG. 11 illustrates an example of a user interface showing a home page of the aggregator system. FIG. 12 illustrates an example of two different devices, a tablet and a smartphone, each displaying the home page web page of the aggregator system. FIG. 13 illustrates an example of a user interface showing four web applications that a user can configure to add to his aggregator system. FIG. 14 illustrates an example of a user interface showing icons representing web applications which were added to the system and from which the user can launch with just one click.

For any new device and in particular for the devices shown, the innovation streamlines user interactions with network, because the user does not need to download and reenter a user ID and password for each of the user's applications. With the technique introduced herein, the user can launch any application already registered in the aggregator platform with a single click, for instance as shown in FIG. 14.

A further efficiency, among others, is afforded the technique introduced here by enabling a user from any device the ability to login with one click to the aggregator system, e.g. as shown in FIG. 11.

A further efficiency is afforded the technique by allowing the user, in addition to launching with one click to a designated application, to add and configure a new application to his already registered applications, as shown in FIGS. 12 and 13.

An Example Machine Overview

Figure 15:
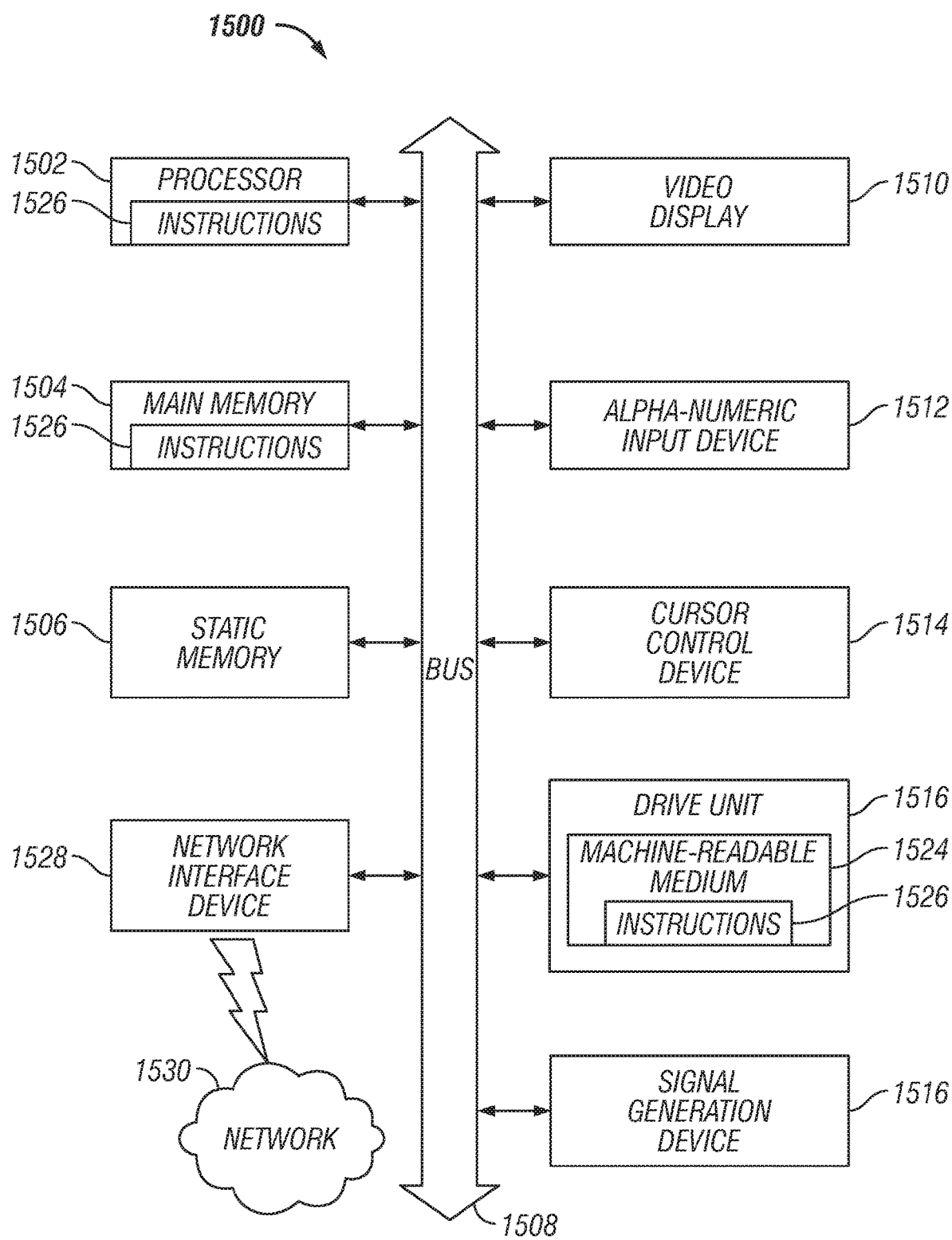
FIG. 15 is a block schematic diagram of a system in the exemplary form of a computer system according to an embodiment.

FIG. 15 is a block schematic diagram of a machine in the exemplary form of a computer system 1500 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1500 includes a processor 1502, a main memory 1504 and a static memory 1506, which communicate with each other via a bus 1508. The computer system 1500 may further include a display unit 1510, for example, a liquid crystal display (LCD) or a cathode ray tube (CRT). The computer system 1500 also includes an alphanumeric input device 1512, for example, a keyboard; a cursor control device 1514, for example, a mouse; a disk drive unit 1516, a signal generation device 1518, for example, a speaker, and a network interface device 1528.

The disk drive unit 1516 includes a machine-readable medium 1524 on which is stored a set of executable instructions, i.e. software, 1526 embodying any one, or all, of the methodologies described herein below. The software 1526 is also shown to reside, completely or at least partially, within the main memory 1504 and/or within the processor 1502. The software 1526 may further be transmitted or received over a network 1530 by means of a network interface device 1528.

In contrast to the system 1500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing computations with cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions that enable users, e.g. users on the go, to login to sSSO web applications using social network identity providers or share sSSO web applications anywhere on such internet-enabled devices, servers, or clients. It further should be appreciated that one or more cloud computing embodiments include allowing a user to login to sSSO web applications using social network identity providers or share sSSO web applications using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method of providing access of web applications over a network to a remote user computer, the method comprising:
   providing access to an aggregator application from the remote computer via a social login identity provider;
   receiving a username associated with the social login identity provider at a lightweight directory access protocol (LDAP) server sent from a data source associated with the aggregator application over the Internet, the LDAP server comprising a microprocessor and a memory that stores the user's informational data;
   identifying the stored user's informational data by comparing the received username to a private username and/or private password previously stored for said user but is inaccessible to said user;
   generating a challenge question having an associated answer, request for biometric or social information from the user, or a request for other relevant stored data about the user, each of which indicates the identity of the user;
   formatting the challenge or requests into data blocks according to a format associated with said social login identity provider; and
   transmitting the formatted challenge or requests over a communication channel to the remote computer intended for the user to answer,
   wherein when the user provides a correct response to the challenge or requests, the LDAP server causing the aggregator application, on the remote computer, to activate, display, and provide access to all of the web applications on which the user has accounts;
   wherein the LDAP server causes the aggregator application to activate and display on the remote computer also web applications on which the user does not have accounts and subsequently are not enabled and wherein the aggregator application is configured to display a visual indicator to indicate that the applications do not have an account for the user and subsequently are not enabled.

2. The method of claim 1, wherein if the user decides to login using a new unregistered login identity provider, and the user never enabled that login identity provider web application for the aggregator application, the aggregator application attempts to identify the user.

3. The method of claim 1, wherein when a second user is delegating an aggregator enabled web application to a plurality of people or within the user's organization to the user, the aggregator application causes the shared web application to automatically appear on the user's interface.

4. A system, comprising:
   a processor; and
   non-transitory computer-readable storage medium coupled to the processor and having instructions stored thereon, which, when executed by the processor, cause the processor to perform operations comprising:
   providing access to an aggregator application from the remote computer via a social login identity provider;
   receiving a username associated with the social login identity provider at a lightweight directory access protocol (LDAP) server sent from a data source associated with the aggregator application over the Internet, the LDAP server comprising a microprocessor and a memory that stores the user's informational data;
   identifying the stored user's informational data by comparing the received username to a private username and/or private password previously stored for said user but is inaccessible to said user;
   generating a challenge question having an associated answer, request for biometric or social information from the user, or request other relevant stored data about the user, each of which indicates the identity of the user;
   formatting the challenge or requests into data blocks according to a format associated with said social login identity provider; and
   transmitting the formatted challenge or requests over a communication channel to the remote computer intended for the user to answer,
   wherein when the user provides a correct response to the challenge or requests, the LDAP server causing the aggregator application, on the remote computer, to activate, display, and provide access to all of the web applications on which the user has accounts;
   wherein the LDAP server causes the aggregator application to activate and display on the remote computer also web applications on which the user does not have accounts and subsequently are not enabled and wherein the aggregator application is configured to display a visual indicator to indicate that the applications do not have an account for the user and subsequently are not enabled.

5. The system of claim 4, wherein if the user decides to login using a new unregistered login identity provider, and the user never enabled that login identity provider web application for the aggregator application, the aggregator application attempts to identify the user.

6. The system of claim 5, wherein when a second user is delegating an aggregator enabled web application to a plurality of people or within the user's organization to the user, the aggregator application causes the shared web application to automatically appear on the user's interface.

7. A non-transitory computer-readable storage medium having stored thereon a computer program comprising a program code for performing, when running on a computer, a method comprising:

provcomputerviding access to an aggregator application from the remote computer via a social login identity provider;

receiving a username associated with the social login identity provider at a lightweight directory access protocol (LDAP) server sent from a data source associated with the aggregator application over the Internet, the LDAP server comprising a microprocessor and a memory that stores the user's informational data;

identifying the stored user's informational data by comparing the received username to a private username and/or private password previously stored for said user but is inaccessible to said user;

generating a challenge question having an associated answer, request for biometric or social information from the user, or a request for other relevant stored data about the user, each of which indicates the identity of the user;

formatting the challenge or requests into data blocks according to a format associated with said social login identity provider; and transmitting the formatted challenge or requests over a communication channel to the remote computer intended for the user to answer, wherein when the user provides a correct response to the challenge or requests, the LDAP server causing the aggregator application, on the remote computer, to activate, display, and provide access to all of the web applications on which the user has accounts, wherein the LDAP server causes the aggregator application to activate and display on the remote computer also web applications on which the user does not have accounts and subsequently are not enabled and wherein the aggregator application is configured to display a visual indicator to indicate that the applications do not have an account for the user and subsequently are not enabled.

* * * * *